US010437235B2

(12) United States Patent
Ishiwari (10) Patent No.: US 10,437,235 B2
(45) Date of Patent: Oct. 8, 2019

(54) NUMERICAL CONTROLLER HAVING A MACHINING TIME PREDICTION FUNCTION

(71) Applicant: FANUC CORPORATION, Minamitsuru-gun, Yamanashi (JP)

(72) Inventor: Hisateru Ishiwari, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 110 days.

(21) Appl. No.: 15/595,155

(22) Filed: May 15, 2017

(65) Prior Publication Data

US 2017/0329312 A1    Nov. 16, 2017

(30) Foreign Application Priority Data

May 16, 2016    (JP) .................................. 2016-098141

(51) Int. Cl.
*G06F 19/00*    (2018.01)
*G05B 19/416*    (2006.01)
(Continued)

(52) U.S. Cl.
CPC ....... *G05B 19/4163* (2013.01); *G05B 19/237* (2013.01); *G05B 19/404* (2013.01);
(Continued)

(58) Field of Classification Search
CPC ............. G05B 19/4163; G05B 19/418; G05B 19/237; G05B 19/4103; G05B 19/4015;
(Continued)

(56) References Cited

U.S. PATENT DOCUMENTS 5,508,596 A * 4/1996 Olsen ...................... B26F 3/004
                                                          318/569
5,600,221 A * 2/1997 Tomatsuri ............ G05B 19/237
                                                          318/601
(Continued)

FOREIGN PATENT DOCUMENTS

JP        H06051821 A    2/1994
JP        H10143218 A    5/1998
                (Continued)

OTHER PUBLICATIONS

Decision to Grant a Patent for Japanese Application No. 2016-098141, dated Jul. 3, 2018, with translation, 6 pages.

*Primary Examiner* — Michael D Masinick
(74) *Attorney, Agent, or Firm* — RatnerPrestia (57) ABSTRACT

A numerical controller enabling prediction of a machining time considering a machine delay occurring in a machine. The numerical controller configured for predicting a reference machining time corresponding to a machining time not considering acceleration/deceleration of an predicting the number of times of acceleration/deceleration of the axis in machining storing information related to a deviation time corresponding to a difference between an actual machining time corresponding to a machining time required for actual machining by the machine and the reference machining time predicted in the machining, calculating a correction time for correcting the reference machining time based on the number of times of acceleration/deceleration predicted and the information related to the deviation time stored, and calculating a predicted machining time obtained by correcting the reference machining time using the correction time.

5 Claims, 4 Drawing Sheets (51) Int. Cl.
  *G05B 19/23* (2006.01)
  *G05B 19/401* (2006.01)
  *G05B 19/4103* (2006.01)
  *G05B 19/418* (2006.01)
  *G05B 19/404* (2006.01)

(52) U.S. Cl.
  CPC ..... *G05B 19/4015* (2013.01); *G05B 19/4103* (2013.01); *G05B 19/418* (2013.01); *G05B 2219/30* (2013.01); *G05B 2219/41148* (2013.01); *G05B 2219/41157* (2013.01)

(58) Field of Classification Search
  CPC .............. G05B 2219/30; G05B 19/404; G05B 2219/41157; G05B 2219/41148; Y02P 90/02
  See application file for complete search history.

(56) References Cited

U.S. PATENT DOCUMENTS

| | | |
|---|---|---|
| 2003/0110006 A1 | 6/2003 | Nakamura |
| 2004/0236462 A1* | 11/2004 | Takeshita ........... G05B 19/4083 700/173 |
| 2009/0248175 A1* | 10/2009 | Eguchi ................ G05B 13/048 700/30 |
| 2011/0163872 A1 | 7/2011 | Pasveer et al. |
| 2012/0109359 A1 | 5/2012 | Mizuno et al. |
| 2012/0296462 A1* | 11/2012 | Otsuki ............... G05B 19/4069 700/104 |
| 2015/0012120 A1* | 1/2015 | Yoshimura ............ G05B 11/36 700/71 |
| 2015/0194805 A1* | 7/2015 | Sagasaki ........... G05B 19/4062 318/569 |
| 2016/0109877 A1 | 4/2016 | Ishiwari et al. |

FOREIGN PATENT DOCUMENTS

| | | |
|---|---|---|
| JP | H 11-28643 A | 2/1999 |
| JP | 2003-175439 A | 6/2003 |
| JP | 2012-502270 A | 1/2012 |
| JP | 2012093975 A | 5/2012 |
| JP | 2012-243152 A | 12/2012 |
| JP | 2014-038482 A | 2/2014 |

\* cited by examiner

| TOTAL DEVIATION TIME $T_{ds}$ [ms] | TOTAL NUMBER OF TIMES OF ACCELERATION/ DECELERATION $C_s$ |
|---|---|
| 18328 | 1510 |

FIG. 3B

| MACHINE TYPE | TOTAL DEVIATION TIME $T_{ds}$ [ms] | TOTAL NUMBER OF TIMES OF ACCELERATION/ DECELERATION $C_s$ |
|---|---|---|
| LATHE MACHINE MODEL A | 18328 | 1510 |
| LATHE MACHINE MODEL B | 30114 | 2124 |
| DRILLING MACHINE MODEL A | 21145 | 1912 |
| ⋮ | ⋮ | ⋮ |

FIG. 3C

| SERIAL NUMBER | TOTAL DEVIATION TIME $T_{ds}$ [ms] | TOTAL NUMBER OF TIMES OF ACCELERATION/ DECELERATION $C_s$ |
|---|---|---|
| SA34011 | 18855 | 1604 |
| SA34012 | 17007 | 1402 |
| SA34013 | 16544 | 1311 |
| ⋮ | ⋮ | ⋮ |

FIG. 4

NUMERICAL CONTROLLER HAVING A MACHINING TIME PREDICTION FUNCTION

BACKGROUND OF THE INVENTION

1. Field of the Invention

The present invention relates to a numerical controller, and particularly relates to a numerical controller having a machining time prediction function that takes servo control and delay of mechanical motion into consideration.

2. Description of the Related Art

In machining a workpiece using a machine tool, in general, machining accuracy deteriorates when a machining speed is increased to shorten a machining time. Conversely, machining accuracy is improved when the machining speed is decreased to prolong the machining time. For this reason, a user who machines the workpiece using the machine tool desires to "machine the workpiece with the machining time as short as possible at machining accuracy within an allowable machining error set in advance". However, it is not easy to ascertain an extent of a machining error and an extent of a machining time with which the workpiece can be machined.

In this regard, various trials and errors have been repeated such that a machining time is attempted to be shortened while maintaining machining accuracy by performing trial machining while changing setting of a parameter, etc., or machining accuracy and a machining time are predicted by performing simulation without trial machining.

As a main conventional art related to predicting a machining time, there are Japanese Patent Application Laid-Open No. 2003-175439, Japanese Patent Application Laid-Open No. 2012-243152, Japanese Patent Application Laid-Open No. 11-028643, Japanese Patent Application Laid-Open No. 2014-038482 A, and Japanese Patent Application Laid-Open No. 2012-502270. Japanese Patent Application Laid-Open No. 2003-175439 discloses a technology for predicting an accurate machining time by accumulating a time of an auxiliary function for each auxiliary code and reflecting an average value thereof on a predicted machining time. Japanese Patent Application Laid-Open No. 2012-243152 discloses a technology for enabling more accurate prediction of a machining time and a machining error by simulating a servo operation. Japanese Patent Application Laid-Open No. 11-028643 discloses a technology for predicting a more accurate machining time than only a predicted machining time by measuring a time corresponding to actual machining during machining and adding the predicted machining time to the actual machining time. In addition, Japanese Patent Application Laid-Open No. 2014-038482 discloses a technology for enabling accurate machining time prediction in consideration of an acceleration and deceleration time and a program execution order by dividing a tool path into smaller units than a block referred to as a segment, and increasing a traveling time of the segment to use the traveling time as a machining time in consideration of processing ability of the numerical controller. Further, in a technology disclosed in Japanese Patent Application Laid-Open No. 2012-502270, a machining time is predicted by calculating delay due to acceleration and deceleration, delay due to servo control, and delay of movement of a machine.

Figure 4:
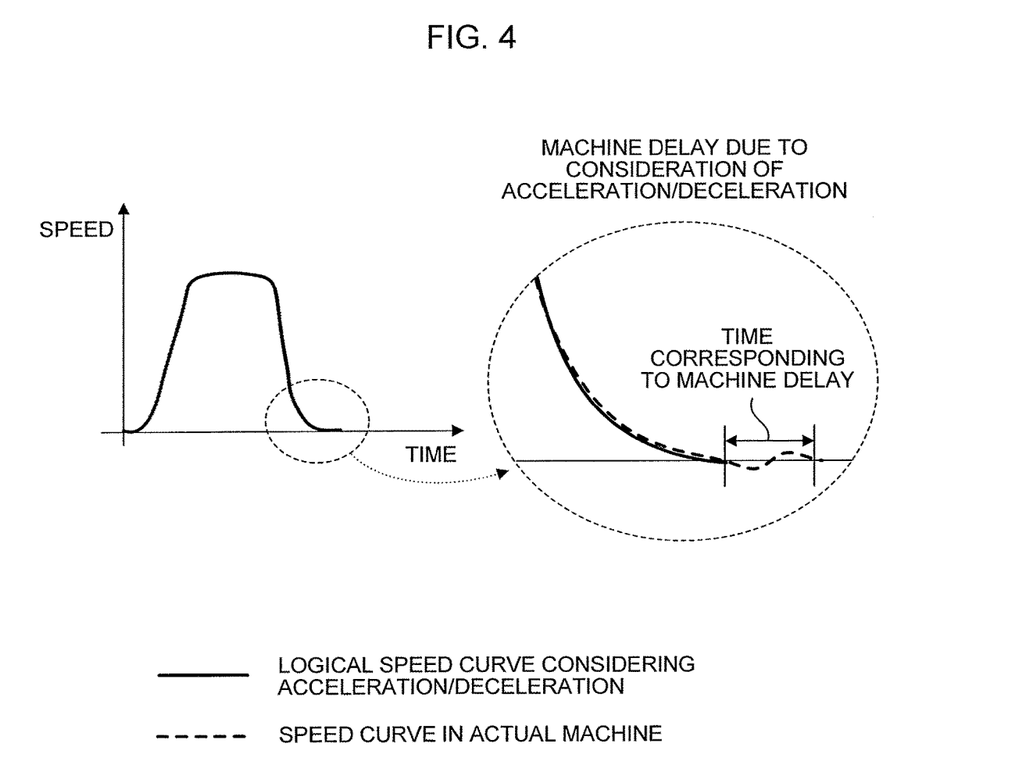
FIG. 4 is a diagram for description of a machine delay.

In general, when the machine is operated, so-called machine delay such as delay due to acceleration/deceleration, delay due to servo control, delay of movement of the machine, etc. occurs due to operation delay based on a frictional force generated in each part, delay of a feedback system, operation delay caused by inertia, etc. (FIG. 4). However, in the technologies disclosed in Japanese Patent Application Laid-Open No. 2003-175439 and Japanese Patent Application Laid-Open No. 2012-243152, such machine delay is not taken into consideration, and thus there is a problem that an error occurs in a machining time prediction result. In addition, in the technology disclosed in Japanese Patent Application Laid-Open No. 11-028643, even though prediction accuracy is high near an end of machining, machine delay is not sufficiently reflected in a prediction result at an early stage of machining, and thus an error occurs in a machining time prediction result. Further, in the technologies disclosed in Japanese Patent Application Laid-Open No. 2014-038482 and Japanese Patent Application Laid-Open No. 2012-502270, even though calculating a time of machine delay is suggested, a scheme of calculating a time of a specific machine delay is not disclosed. In addition, since a characteristic of machine delay is different for each machine, even when a calculation scheme is disclosed, it is difficult to respond to all types of machine delays, and accurate prediction cannot be performed.

SUMMARY OF THE INVENTION

In this regard, an object of the invention is to provide a numerical controller enabling prediction of a machining time at high accuracy in consideration of machine delay occurring in a machine.

In general, it is not possible to perfectly simulate machine motion and servo motion, and thus a deviation time occurs at all times between a predicted machining time and an actual machining time. Therefore, in the invention, the above problem is solved by providing the numerical controller with a function of measuring and accumulating a deviation time and an occurrence condition thereof for each actual machining, and calculating a deviation time from an accumulation result at the time of predicting a subsequent machining time, thereby correcting a predicted machining time.

In addition, a numerical controller according to the invention is a numerical controller performs machining of a workpiece by controlling a machine including at least one axis based on a machining program, and includes a reference machining time prediction unit for predicting a reference machining time corresponding to a machining time not considering acceleration/deceleration of the axis based on the machining program, an acceleration/deceleration frequency prediction unit for predicting the number of times of acceleration/deceleration of the axis in the machining based on the machining program, a data storage unit for storing information related to a deviation time corresponding to a difference between an actual machining time corresponding to a machining time required for actual machining by the machine and the reference machining time predicted in the machining, a correction time calculation unit for calculating a correction time for correcting the reference machining time based on the number of times of acceleration/deceleration predicted by the acceleration/deceleration frequency prediction unit and the information related to the deviation time stored in the data storage unit, and a machining time prediction unit for calculating a predicted machining time obtained by correcting the reference machining time using the correction time.

The numerical controller according to the invention further includes an actual machining measurement unit for measuring an actual machining time corresponding to a machining time actually required for machining based on the machining program and an actual number of times of acceleration/deceleration corresponding to the number of times of acceleration/deceleration of an actual axis, a deviation time calculation unit for calculating a deviation time corresponding to a difference between the actual machining time measured by the actual machining measurement unit and the reference machining time predicted by the reference machining time prediction unit, and updating the information related to the deviation time stored in the data storage unit by the calculated deviation time, and an acceleration/deceleration frequency storage unit for updating the information related to the deviation time stored in the data storage unit by the number of times of acceleration/deceleration of the axis in the machining based on the machining program predicted by the acceleration/deceleration frequency prediction unit or the actual number of times of acceleration/deceleration of the machining based on the machining program.

In the numerical controller according to the invention, the information related to the deviation time includes a total deviation time corresponding to a sum of deviation times corresponding to a difference between an actual machining time corresponding to a machining time actually required for at least one machining by the machine performed in a past and a reference machining time predicted based on a machining program used in the machining, and a total number of times of acceleration/deceleration corresponding to a sum of the number of times of acceleration/deceleration of the axis predicted based on the machining program in each machining or an actual number of times of acceleration/deceleration of machining based on the machining program, and the correction time calculation unit calculates the correction time based on the number of times of acceleration/deceleration predicted by the acceleration/deceleration frequency prediction unit, the total deviation time, and the total number of times of acceleration/deceleration.

In the numerical controller according to the invention, the information related to the deviation time stored in the data storage unit is stored for machine type.

In the numerical controller according to the invention, the information related to the deviation time stored in the data storage unit is stored for each individual machine.

According to the invention, it is possible to highly accurately predict a machining time considering a delay of servo control and mechanical motion.

BRIEF DESCRIPTION OF THE DRAWINGS

The above and other objects and features of the present invention will be obvious from ensuing description of embodiments with reference to accompanying drawings, in which.

DETAILED DESCRIPTION OF THE PREFERRED EMBODIMENTS

Hereinafter, embodiments of the invention will be described with reference to drawings.

In the invention, since a deviation time generally increases at the time of acceleration/deceleration, a machining time is relatively easily and highly accurately predicted by accumulating a deviation time between a predicted machining time and an actual machining time and the number of times of acceleration/deceleration in a storage unit of a numerical controller, and adding the accumulated deviation time to a subsequent predicted time in view of the fact that an occurrence condition is considered to be roughly proportional to the number of times of acceleration/deceleration of each axis (moving axis, main axis, etc.) of a machine in machining control.

Figure 1:
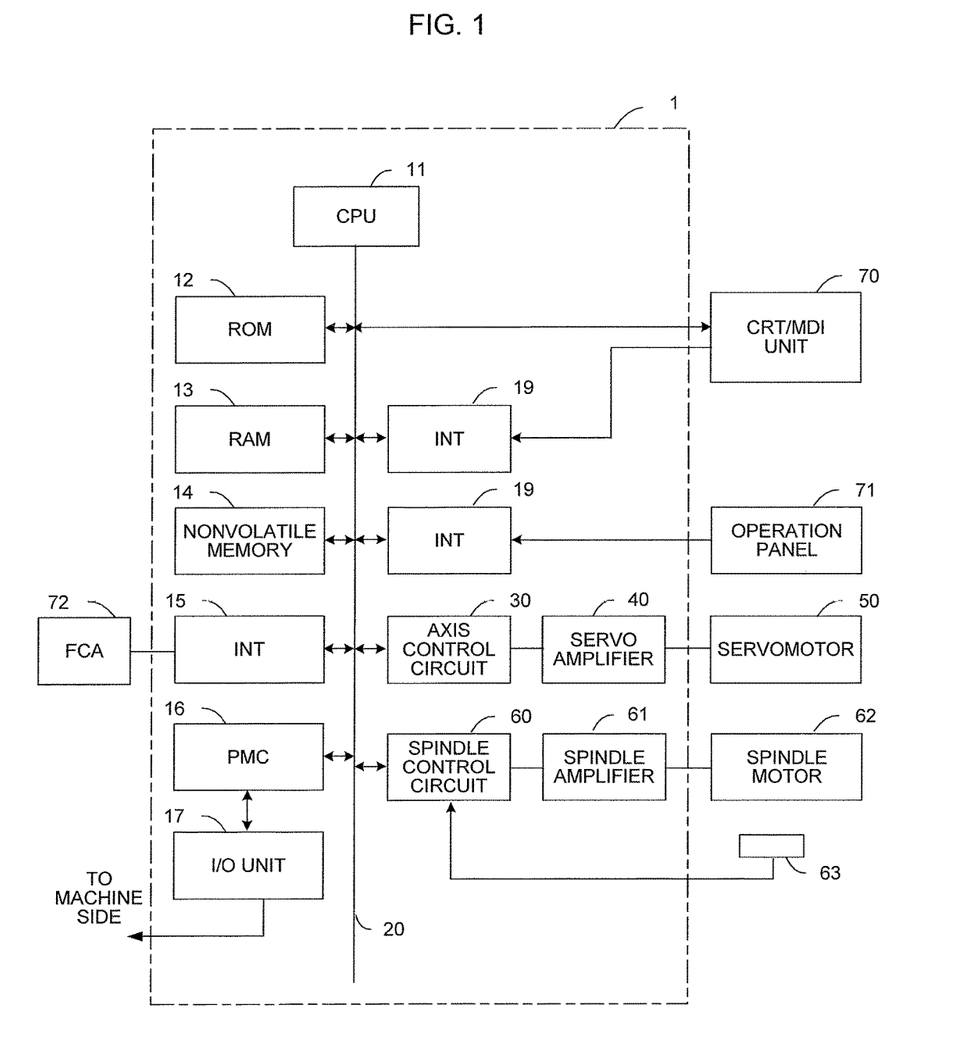
FIG. 1 is a hardware configuration diagram illustrating a main part of a numerical controller according to an embodiment of the invention.

FIG. 1 is a hardware configuration diagram illustrating a numerical controller according to an embodiment of the invention and a main part of a machine tool driven and controlled by the numerical controller. A central processing unit (CPU) 11 included in the numerical controller 1 is a processor that controls the numerical controller 1 as a whole. The CPU 11 reads a system program stored in a read only memory (ROM) 12 via a bus 20, and controls the entire numerical controller 1 according to the system program. A random access memory (RAM) 13 stores temporary calculation data, display data, various data input by an operator via a cathode ray tube/manual data input (CRT/MDI) unit 70, etc.

A nonvolatile memory 14 is configured as a memory that is kept in a storage state even when a power supply of the numerical controller 1 is turned off, for example, by being backed up by a battery (not illustrated). The nonvolatile memory 14 stores a machining program described below which is read via an interface 15, and a machining program input via the CRT/MDI unit 70. The nonvolatile memory 14 further stores a machining program operation processing program used for operating the machining program, a machining time prediction processing program, etc., which are developed in the RAM 13 at the time of execution. In addition, various system programs for executing processing of an edit mode, etc. required for creating and editing the machining program are written to the ROM 12 in advance. Various machining programs such as the machining program that executes the invention can be input via the interface 15 or the CRT/MDI unit 70, and stored in the nonvolatile memory 14.

The interface 15 is an interface for connecting the numerical controller 1 and an external device 72 such as an adapter. The machining program and various parameters are read from the external device 72 side. Further, the machining program edited in the numerical controller 1 can be stored in external storage means via the external device 72. A programmable machine controller (PMC) 16 outputs a signal to a peripheral unit (for example, an actuator such as a tool change robot hand) of the machine tool via an input/output (I/O) unit 17 using a sequence program built in the numerical controller 1 to control the peripheral unit. In addition, the PMC 16 receives signals of various switches, etc. of an operation panel provided in a main body of the machine tool, performs necessary signal processing, and passes the signals to the CPU 11.

The CRT/MDI unit 70 is a manual data input device having a display, a keyboard, etc. The interface 18 receives a command and data from a keyboard of the CRT/MDI unit 70 and passes the received command and data to the CPU 11. An interface 19 is connected to an operation panel 71 having a manual pulse generator, etc.

An axis control circuit 30 for controlling an axis of the machine tool receives an axis movement command amount from the CPU 11, and outputs an axis command to a servo amplifier 40. In response to this command, the servo amplifier 40 drives a servomotor 50 for moving the axis of the machine tool. The servomotor 50 of the axis incorporates a position/speed detector, and feeds a position/speed feedback signal from the position/speed detector back to the axis control circuit 30 to perform feedback control of a position/speed.

In the hardware configuration diagram of FIG. 1, only one axis control circuit 30, one servo amplifier 40, and one servomotor 50 are illustrated. However, in practice, the numbers of axis control circuits 30, servo amplifiers 40, and servo motors 50 correspond to the number of axes provided in the machine tool. In addition, FIG. 1 omits feedback of the position/speed from the servomotor 50.

A spindle control circuit 60 receives a main axis rotation command to the machine tool and outputs a spindle speed signal to a spindle amplifier 61. In response to this spindle speed signal, the spindle amplifier 61 rotates a spindle motor 62 of the machine tool at a commanded rotation speed to drive the tool.

A position coder 63 is coupled to the spindle motor 62 by a gear, a belt, etc., the position coder 63 outputs a feedback pulse in synchronization with rotation of a main axis, and the feedback pulse is read by the CPU 11.

Figure 2:
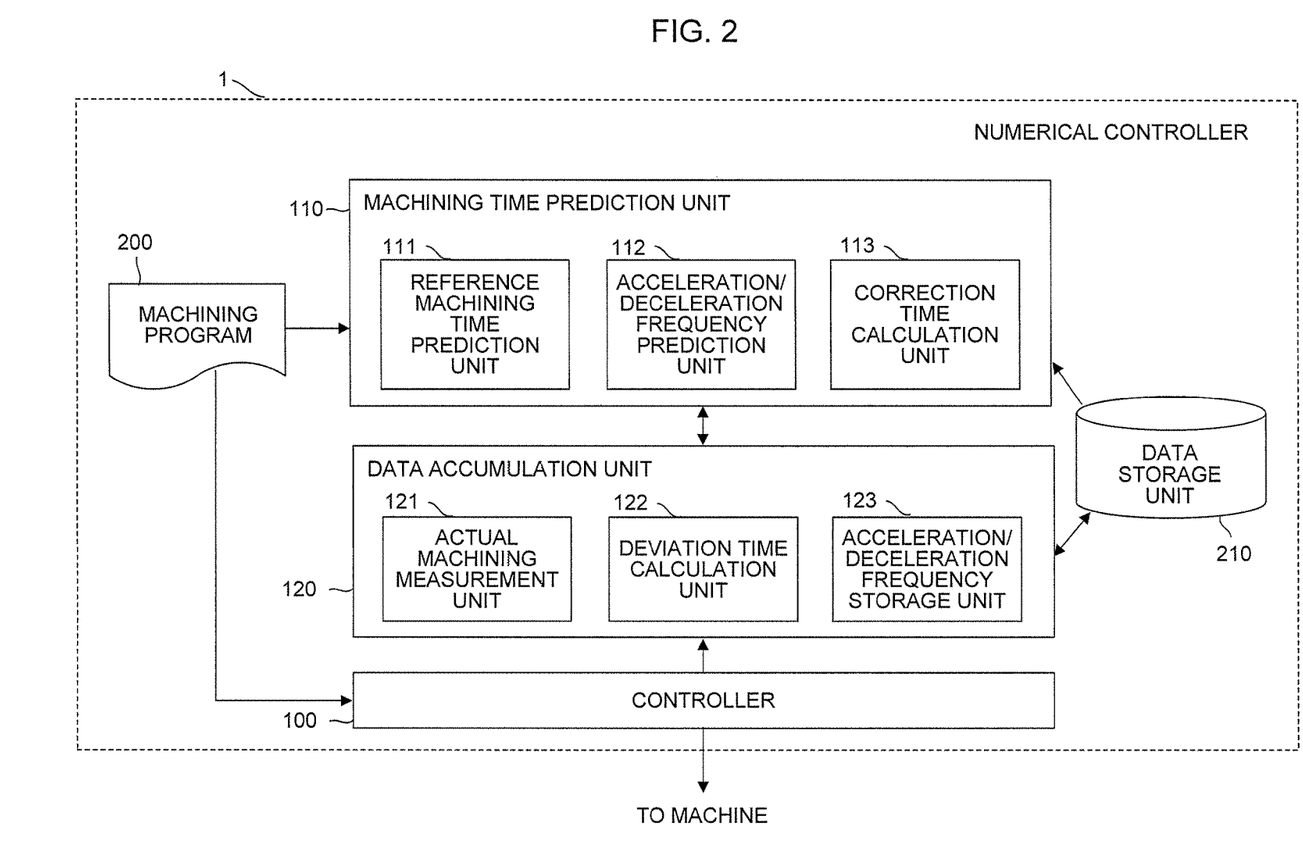
FIG. 2 is a schematic functional block diagram of the numerical controller according to the embodiment of the invention.

FIG. 2 illustrates a schematic functional block diagram according to an embodiment when a function of predicting a machining time required for machining performed based on the machining program provided by the invention is installed on the numerical controller 1 illustrated in FIG. 1 by a system program. Each functional means illustrated in FIG. 2 is implemented when the CPU 11 illustrated in FIG. 1 executes the system program to provide each function. The numerical controller 1 of the present embodiment includes a controller 100, a machining time prediction unit 110, and a data accumulation unit 120.

The controller 100 sequentially reads a machining program 200 from a memory (not illustrated) to analyze the machining program 200, generates command data for driving each servomotor or spindle motor included in the machine based on an analysis result, and controls the machine based on the command data, thereby performing machining control. The controller 100 is functional means implemented by the CPU 11 that executes analysis processing, the axis control circuit 30 that controls each axis, the servo amplifier 40, the spindle control circuit 60, the spindle amplifier 61, etc. illustrated in FIG. 1.

The machining time prediction unit 110 is functional means that predicts a machining time based on data including a deviation time or the number of times of acceleration/deceleration stored at the time of machining performed in the past and stored in a data storage unit 210 described below. Prediction of the machining time by the machining time prediction unit 110 may be performed for all blocks included in the machining program 200 before starting machining control based on the machining program 200 by the controller 100. The machining time prediction unit 110 includes a reference machining time prediction unit 111, an acceleration/deceleration frequency prediction unit 112, and a correction time calculation unit 113.

The reference machining time prediction unit 111 analyzes the machining program 200 corresponding to a prediction target of the machining time, and predicts a machining time $T_{e1}$ not considering a delay time due to a machine delay related to machining based on the machining program 200. For example, the conventional technologies disclosed in Japanese Patent Application Laid-Open No. 2003-175439, and Japanese Patent Application Laid-Open No. 2012-243152 can be used to predict the machining time $T_{e1}$ not considering the delay time due to the machine delay.

The acceleration/deceleration frequency prediction unit 112 analyzes the machining program 200 corresponding to the prediction target of the machining time, and calculates the number of times of acceleration/deceleration $C_1$ of each axis predicted in machining based on the machining program 200. As a method of calculating the number of times of acceleration/deceleration $C_1$ of each axis to be predicted, for example, a command of each block in the machining program 200 may be analyzed, and the number of times of starting and ending of axis movement may be simply calculated as the number of times of acceleration/deceleration of each axis to be predicted. Alternatively, the number of times of acceleration/deceleration of each axis to be predicted may be calculated by subtracting the number of times of acceleration/deceleration omitted by an optimization process of axis movement from the number of times of starting and ending of axis movement. The acceleration/deceleration frequency prediction unit 112 preferably calculates the number of times of acceleration/deceleration $C_1$ of each axis to be predicted based on an axis control algorithm used in the controller 100.

The correction time calculation unit 113 calculates an average deviation time $T_{da}$ per acceleration/deceleration using Equation 1 below based on a total deviation time $T_{ds}$ and a total number of times of acceleration/deceleration $C_s$ stored in the data storage unit 210 described below.

$$T_{da}=T_{ds}/C_s \qquad \text{[Equation 1]}$$

Further, the correction time calculation unit 113 calculates a correction time $T_d$ due to the machine delay using Equation 2 below based on the average deviation time $T_{da}$ per acceleration/deceleration calculated using Equation 1 and the number of times of acceleration/deceleration $C_1$ of each axis to be predicted in machining based on the machining program 200 calculated by the acceleration/deceleration frequency prediction unit 112.

$$T_d=T_{da}\times C_1 \qquad \text{[Equation 2]}$$

Then, the machining time prediction unit 110 calculates an accurate predicted machining time T using Equation 3 below based on the machining time $T_{e1}$ not considering the delay time due to the machine delay related to machining based on the machining program 200 calculated by the reference machining time prediction unit 111 and the correction time $T_d$ due to the machine delay calculated by the correction time calculation unit 113.

$$T=T_{e1}+T_d \qquad \text{[Equation 3]}$$

Meanwhile, the data accumulation unit 120 is functional means that accumulates information related to machining by machining control of the machine in the data storage unit 210 when the machining control is performed by the numerical controller 1. The data accumulation unit 120 may automatically accumulate the information related to machining in the data storage unit 210 each time the machining control of the machine is performed by the numerical controller 1, or accumulate the information related to machining in the data storage unit 210 only when the operator commands accumulation. The data accumulation unit 120 includes an actual machining measurement unit 121, a deviation time calculation unit 122, and an acceleration/deceleration frequency storage unit 123.

The actual machining measurement unit 121 measures an actual machining time $T_{r1}$ taken from a start to an end of machining by the machining program 200 when machining control of the machine based on the machining program 200 by the controller 100 is performed. For example, the actual machining measurement unit 121 uses a real time block (RTC) (not illustrated), etc. incorporated in the numerical controller 1 to measure a time. The actual machining measurement unit 121 may measure the actual machining time $T_{r1}$ by monitoring a processing state of the machining program by the controller 100. In addition, the actual machining measurement unit 121 may be configured to measure an actual number of times of acceleration/deceleration $C_{r1}$ of each axis in addition to the actual machining time $T_{r1}$ when machining control of the machine based on the machining program 200 by the controller 100 is performed.

The deviation time calculation unit 122 calculates a deviation time $T_{d1}$ using Equation 4 below based on the machining time $T_{e1}$ not considering the delay time due to the machine delay related to machining based on the machining program 200 predicted by the reference machining time prediction unit 111 and the actual machining time $T_{r1}$ required for machining by machining control of the machine based on the machining program 200 measured by the actual machining measurement unit 121. In addition, the deviation time calculation unit 122 adds the calculated deviation time $T_{d1}$ to a past total deviation time $T_{ds}$ stored in the data storage unit 210 to update the past total deviation time $T_{ds}$ with a new total deviation time $T_{ds}$, and stores the new total deviation time $T_{ds}$ in the data storage unit 210.

$$T_{d1}=T_{r1}-T_{e1}$$ [Equation 4]

The acceleration/deceleration frequency storage unit 123 adds the number of times of acceleration/deceleration $C_1$ of each axis to be predicted calculated by the acceleration/deceleration frequency prediction unit 112 to a past total number of times of acceleration/deceleration $C_s$ stored in the data storage unit 210 to update the past total number of times of acceleration/deceleration $C_s$ with a new total number of times of acceleration/deceleration $C_s$, and stores the new total number of times of acceleration/deceleration $C_s$ in association with the past total deviation time $T_{ds}$ in the data storage unit 210. The actual number of times of acceleration/deceleration $C_{r1}$ of each axis in actual machining measured by the actual machining measurement unit 121 may be used instead of the number of times of acceleration/deceleration $C_1$ of each axis predicted by the acceleration/deceleration frequency prediction unit 112.

The data storage unit 210 associates and stores a total deviation time $T_{ds}$ obtained by adding up deviation times calculated by the deviation time calculation unit 122 in machining by machining control of the machine performed in the past with the number, of times of acceleration/deceleration $C_1$ of each axis calculated by the acceleration/deceleration frequency prediction unit 112 in the machining or a total number of times of acceleration/deceleration $C_s$ obtained by adding up the actual number of times of acceleration/deceleration $C_{r1}$ of each axis measured by the actual machining measurement unit 121. For example, the data storage unit 210 may be provided by ensuring a storage area on the nonvolatile memory 14.

Figure 3A:
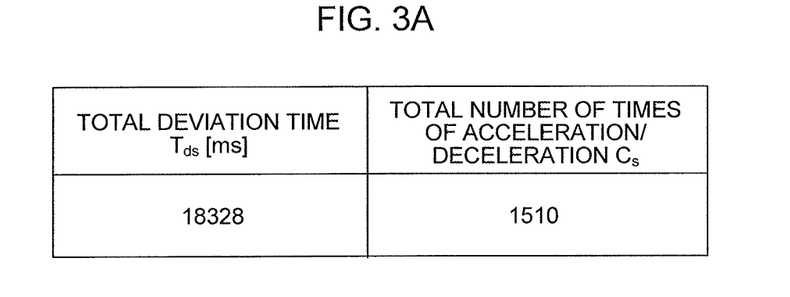
FIG. 3A is a diagram illustrating an example in which one set of a total deviation time $T_{ds}$ and a total number of times of acceleration/deceleration $C_s$ in association with each other is stored.
Figure 3B:
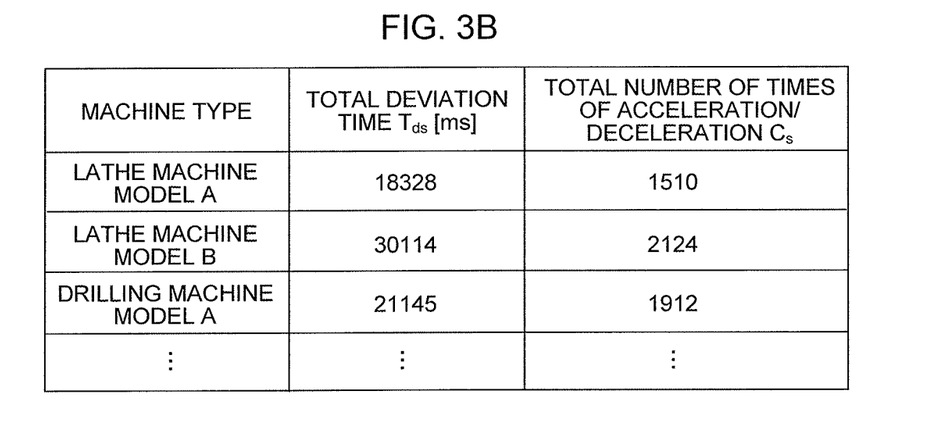
FIG. 3B is a diagram illustrating an example in which the total deviation time $T_{ds}$ and the total number of times of acceleration/deceleration $C_s$ are stored in association with each other for each type of machine.
Figure 3C:
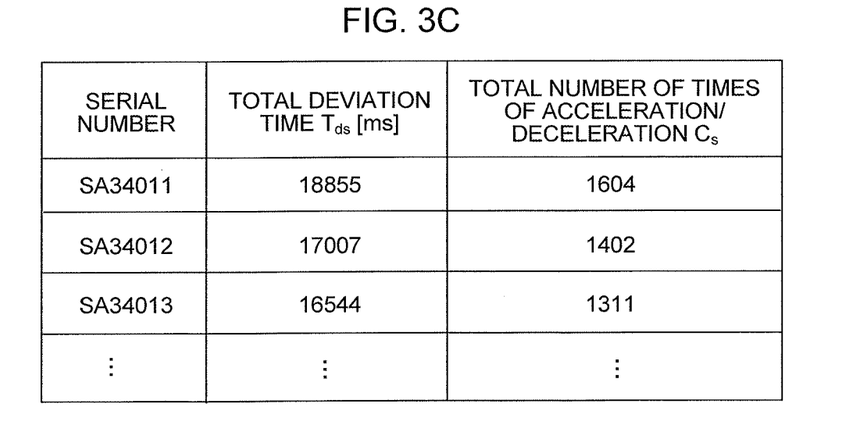
FIG. 3C is a diagram illustrating an example in which the total deviation time $T_{ds}$ and the total number of times of acceleration/deceleration $C_s$ are stored in association with each other for each serial number capable of identifying an individual machine.

FIG. 3A, FIG. 3B, and FIG. 3C are diagrams illustrating examples of the total deviation time $T_{ds}$ and the total number of times of acceleration/deceleration $C_s$ stored in the data storage unit 210. For example, as illustrated in FIG. 3A, the data storage unit 210 may store a set of the total deviation time $T_{ds}$ and the total number of times of acceleration/deceleration $C_s$ in association with each other. In this case, the deviation time calculation unit 122 and the acceleration/deceleration frequency storage unit 123 update the same total deviation time $T_{ds}$ and the same total number of times of acceleration/deceleration $C_s$ regardless of a type of the machine, and the machining time prediction unit 110 and the correction time calculation unit 113 calculates each value using the same total deviation time $T_{ds}$ and the same total number of times of acceleration/deceleration $C_s$ regardless of the type of the machine.

In addition, for example, as illustrated in FIG. 3B, the data storage unit 210 can store the total deviation time $T_{ds}$ and the total number of times of acceleration/deceleration $C_s$ in association with each other for each type of machine. In this case, the deviation time calculation unit 122 and the acceleration/deceleration frequency storage unit 123 update a set of the total deviation time $T_{ds}$ and the total number of times of acceleration/deceleration $C_s$ corresponding to a type of machine which is currently controlled, and the machining time prediction unit 110 and the correction time calculation unit 113 calculates each value using the set of the total deviation time $T_{ds}$ and the total number of times of acceleration/deceleration $C_s$ corresponding to a type of machine which is currently controlled.

Further, for example, as illustrated in FIG. 3C, the data storage unit 210 may store the total deviation time $T_{ds}$ and the total number of times of acceleration/deceleration $C_s$ in association with each other for each individual machine (for each serial number capable of identifying an individual machine in FIG. 3C). In this case, the deviation time calculation unit 122 and the acceleration/deceleration frequency storage unit 123 update a set of the total deviation time $T_{ds}$ and the total number of times of acceleration/deceleration $C_s$ corresponding to a serial number of a machine which is currently controlled, and the machining time prediction unit 110 and the correction time calculation unit 113 calculates each value using the set of the total deviation time $T_{ds}$ and the total number of times of acceleration/deceleration $C_s$ corresponding to the serial number of the machine which is currently controlled.

A type or a serial number of a machine can be acquired and specified from the machine using a general function of the numerical controller.

In the numerical controller 1 having such a configuration, the total deviation time $T_{ds}$ and the total number of times of acceleration/deceleration $C_s$ calculated in machining by machining control of the machine performed in the past are stored in the data storage unit 210, and a machining time considering a machine delay such as a delay of servo control and mechanical motion based on the total deviation time $T_{ds}$ and the total number of times of acceleration/deceleration $C_s$ may be predicted with reference to the data storage unit 210 in subsequent machining. Thus, a machining time may be more accurately predicted when compared to a conventional art. There is a problem that a machining time may not be highly accurately predicted when the total deviation time $T_{ds}$ and the total number of times of acceleration/deceleration $C_s$ are not stored in the data storage unit in an initial operation of the numerical controller. However, such a problem can be easily dealt with using the total deviation time $T_{ds}$ and the total number of times of acceleration/deceleration $C_s$ transferred from a data storage unit included in another same type of numerical controller, or by providing data of the total deviation time $T_{ds}$ and the total number of times of acceleration/deceleration $C_s$ prepared by a manufacturer of the numerical controller.

Even though embodiments of the invention have been described so far, the invention is not limited only to examples of the above-described embodiments, and can be implemented in various modes by making appropriate changes.

For example, the above-described embodiments show an example of predicting the machining time through blocks of the whole machining program. However, for example, the machining time may be predicted for some blocks having acceleration/deceleration.

In the above embodiments, the data storage unit is provided inside the numerical controller. However, the data storage unit can be provided in a host computer of a factory and shared between numerical controllers, and each of the numerical controllers may refer to and update data stored in the data storage unit provided in the host computer via a network. Further, the data storage unit may be provided on a server installed by the manufacturer of the numerical controller and allowed to be shared among numerical controllers of customers.

In the above embodiments, both the machining time prediction unit and the data accumulation unit are included. However, for example, as long as sufficient reliable data is accumulated in the data storage unit in advance, the numerical controller can be used as a numerical controller that highly accurately predicts the machining time when a configuration of the data accumulation unit is omitted, and only the machining time prediction unit (and each functional means included in the machining time prediction unit) and the data storage unit are mounted on the numerical controller. In this case, even though updating of the data storage unit is no longer performed, when machining using the same machine is to be performed, the machining time can be predicted at sufficiently high accuracy without performing updating of the data storage unit (adjustment of data according to an environment).

Furthermore, in the above-described embodiments, each of the machining time prediction unit and the data accumulation unit includes another functional means. However, such an inclusion relationship may not be adopted, and a function and an effect of the invention are not changed even when each functional means is installed as independent functional means.

The invention claimed is:

1. A numerical controller performing machining of a workpiece by controlling a machine including at least one axis based on a machining program, the numerical controller comprising:
a reference machining time prediction unit for, prior to a first actual machining by the machine, predicting a reference machining time corresponding to a machining time not considering acceleration/deceleration of the axis based on the machining program;
an acceleration/deceleration frequency prediction unit for, prior to the first actual machining by the machine, predicting the number of times of acceleration/deceleration of the axis in the machining based on the machining program;
a data storage unit for storing information related to a deviation time corresponding to a difference between a first actual machining time corresponding to a machining time required for the first actual machining by the machine and the reference machining time;
a correction time calculation unit for calculating, after the first actual machining, a correction time for correcting the reference machining time based on the number of times of acceleration/deceleration predicted by the acceleration/deceleration frequency prediction unit and the information related to the deviation time stored in the data storage unit; and
a machining time prediction unit for calculating a predicted machining time for a second actual machining subsequent to the first actual machining, by correcting the reference machining time using the correction time.

2. The numerical controller according to claim 1, further comprising:
an actual machining measurement unit for measuring the first actual machining time and the second actual machining time based on the machining program and an actual number of times of acceleration/deceleration corresponding to the number of times of acceleration/deceleration of an actual axis;
a deviation time calculation unit for calculating a deviation time corresponding to a difference between the first actual machining time and the reference machining time predicted by the reference machining time prediction unit, and updating the information related to the deviation time stored in the data storage unit by the calculated deviation time; and
an acceleration/deceleration frequency storage unit for updating the information related to the deviation time stored in the data storage unit by the number of times of acceleration/deceleration of the axis in the machining based on the machining program predicted by the acceleration/deceleration frequency prediction unit or an actual number of times of acceleration/deceleration of the machining based on the machining program.

3. The numerical controller according to claim 1,
wherein the information related to the deviation time includes
a total deviation time corresponding to a sum of deviation times corresponding to a difference between the second actual machining time and a reference machining time predicted based on a machining program used in the machining, and
a total number of times of acceleration/deceleration corresponding to a sum of the number of times of acceleration/deceleration of the axis predicted based on the machining program in each machining or an actual number of times of acceleration/deceleration of machining based on the machining program, and
the correction time calculation unit calculates the correction time based on the number of times of acceleration/deceleration predicted by the acceleration/deceleration frequency prediction unit, the total deviation time, and the total number of times of acceleration/deceleration.

4. The numerical controller according to claim 1, wherein the information related to the deviation time stored in the data storage unit is stored for machine type.

5. The numerical controller according to claim 1, wherein the information related to the deviation time stored in the data storage unit is stored for each individual machine.

* * * * *